March 15, 1949.　　　　S. ROSENZWEIG　　　　2,464,613
MACHINERY BASE
Filed March 31, 1945　　　　　　　　　　3 Sheets-Sheet 3
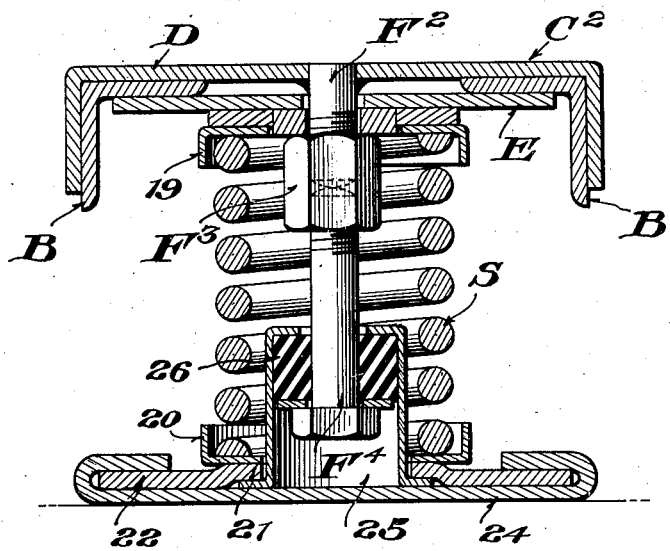
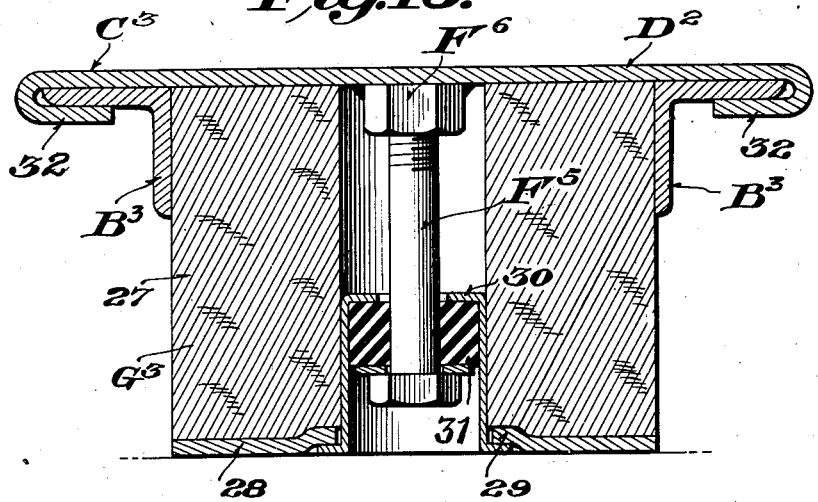
Inventor
S. Rosenzweig,
By （signature） Attorney Patented Mar. 15, 1949

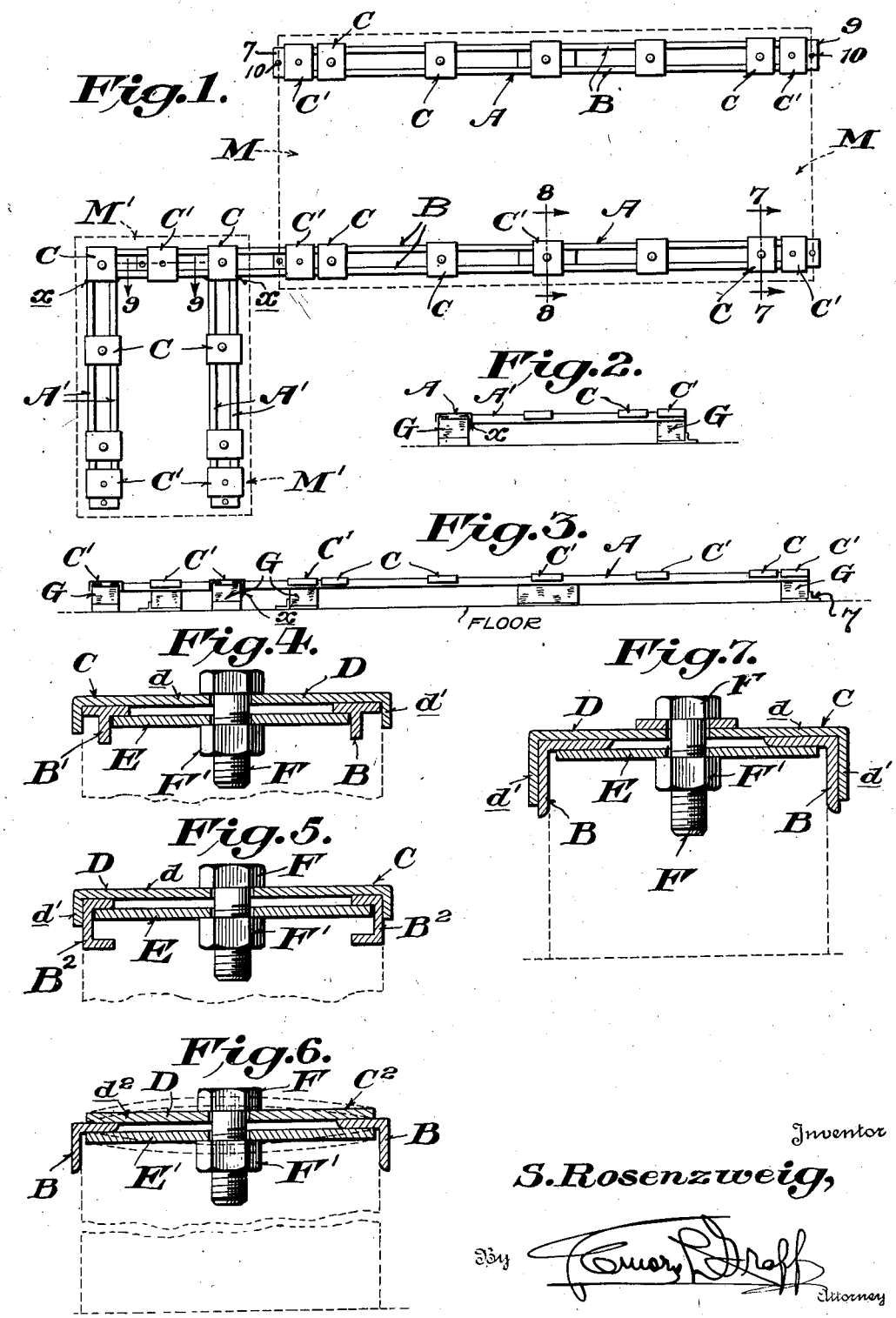

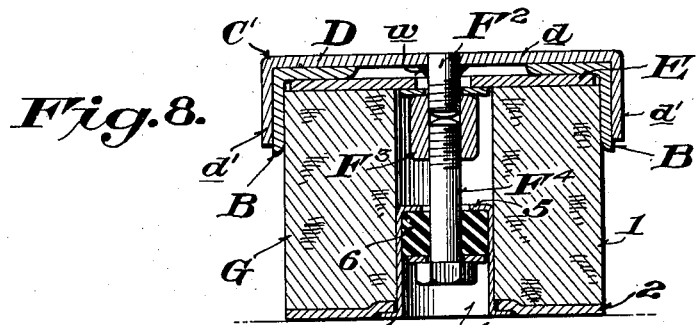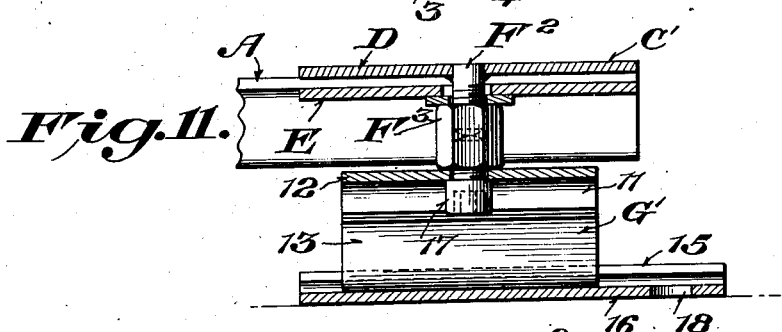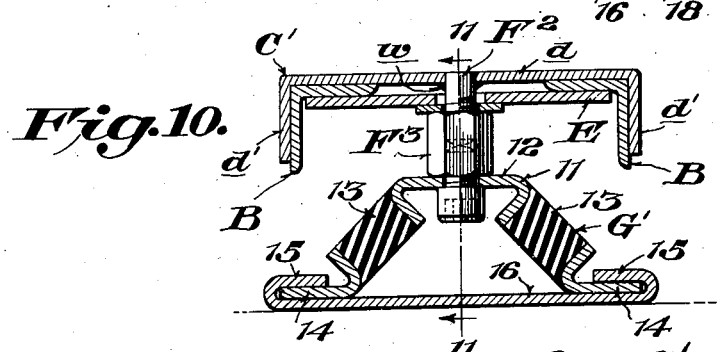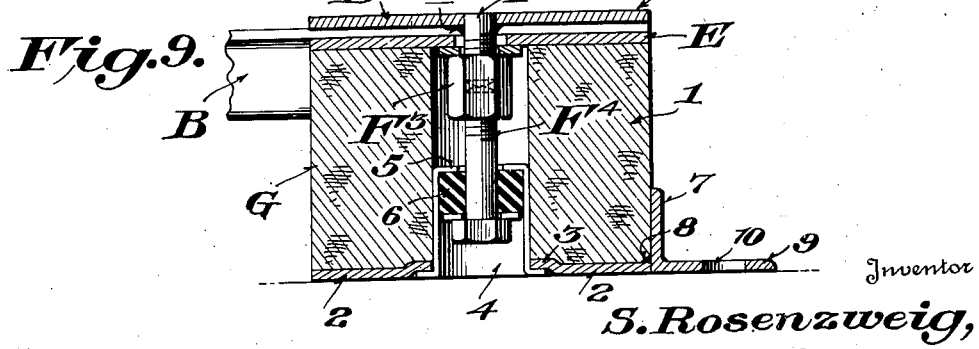

2,464,613

UNITED STATES PATENT OFFICE 2,464,613

MACHINERY BASE

Siegfried Rosenzweig, New York, N. Y.

Application March 31, 1945, Serial No. 585,832

14 Claims. (Cl. 248—22)

This invention relates to vibration isolation supports for machinery bases such, for example, as a fan and motor combination, although it has general utility in the entire machine installation field.

A primary object is to provide a construction of extraordinary flexibility in assembly and erection thereby making it possible to meet a wide range of specifications through the utilization of a novel arrangement of standard structural shapes and special clamping devices to form skeleton frames of any length, with a minimum expenditure of labor and material, while, at the same time, obtaining rigidity and strength as well as simplicity of installation procedure which encourages and insures accurate positioning of the frames and isolation units relative to the machine or load and the sub-base or floor.

Another object is to provide a frame including rails held in spaced relation by novel adjustable clamping devices which are so constructed as to be placed, in situ, at proper locations, not only to keep the rails from spreading, but also to anchor the machine on the frame and to secure the isolation units in selected positions adequately to support the distributed load or weight of the machine.

A further object, in connection with the clamping devices, is to provide novel means which enables one of the primary parts of said clamping devices, with slight modification, readily to perform two functions, namely, to serve as an anchor to secure a machine base to the frame, or to secure isolation units in proper position relative to the frame and load.

A general object is to reduce the welding of parts at the site of installation to a minimum, and, as a whole, to utilize pre-fabricated parts and units which may be stocked and made ready for special installations with a minimum of preliminary preparation.

With the above and other objects in view, which will more readily appear as the nature of the invention is better understood, the same consists in the novel construction, combination, and arrangement of parts, hereinafter more fully described, illustrated, and claimed.

A preferred and practical embodiment of the invention is shown in the accompanying drawings in which:

Figure 1 is a plan view of a machinery base constructed in accordance with the present invention arranged to support a fan and motor assembly.

Figure 2 is an end elevation looking at the extreme left-hand frame part of Figure 1.

Figure 3 is a side elevation of the angular frame elements of Figure 1.

Figure 4 is a detail cross-sectional view illustrating the use of T-shaped sections as the rails of the frame.

Figure 5 is a detail cross-sectional view illustrating the use of channel members as the rails of the frame.

Figure 6 is a detail cross-sectional view illustrating the modification of the clamping devices which engage the rails.

Figure 7 is a vertical cross-sectional view taken on the line 7—7 of Figure 1.

Figure 8 is a detail cross-sectional view taken on the line 8—8 of Figure 1.

Figure 9 is a vertical cross-sectional view taken on the line 9—9 of Figure 1.

Figure 10 is a vertical cross-sectional view of a modified form of isolation unit.

Figure 11 is a longitudinal sectional view taken on the line 11—11 of Figure 10.

Figure 12 is a vertical cross sectional view of an isolator unit of the metal coil spring type.

Figure 13 is a vertical cross sectional view of another isolation unit illustrating a modification of the top clamping plate.

Similar reference characters designate corresponding parts of the several figures of the drawings.

As previously indicated, one of the distinctive features of the invention is to provide a construction which is flexible in the sense that its elements may be pre-fabricated and carried in stock so that when a particular specification is to be met, assembly of the various elements is simplified, while, at the same time, welding and drilling operations are reduced to a minimum. For example, where structural shapes have been heretofore used in fabricating a machinery base, it has usually been necessary to drill or tap the same at the factory or at the point of installation. This step in fabrication at the factory requires workmen to lift sections of considerable weight to a drill press for drilling with the consequence that this procedure often results in inaccurate drilling due to the human element involved. If drilling is required at the site, apparatus or tools must be carried along.

Also, since in some cases, for example, where lateral frames are required, welding in the shop or factory is desirable as distinguished from welding at the site of installation to avoid transporting welding apparatus. Heretofore, if the completely assembled main frame as well as the lateral frames were all welded together at the shop laborious handling was required and unwarranted cargo space was necessary for transportation. But, with the present invention these difficulties are avoided since parts only of the ends of the lateral frames need to be welded to one rail of the main frame at the shop. Moreover, it has previously been necessary to affix the isolation units to the frame at the time of shop assembly with the result that when the frames were placed at the site of installation, the units were not exactly in proper position on the frame due, either to inequalities in the sub-base or floor, or an unexpected distribution of weight of the machine relative to the frame.

All of the foregoing difficulties are obviated by the practice of the present invention which permits of the selection of the various parts required for a particular installation and shipping them substantially in what may be termed "knockdown" form to the site of installation. The various parts may then be assembled by connecting the rails through the clamping devices without the use of drills or other special equipment and in such a way that the said clamping devices, as well as the isolation units, may be slidably adjusted along the rails to the proper position respectively to anchor the machinery base, and support the rails on the sub-base.

In view of the general considerations above set forth, it may be pointed out that the present invention includes one or more frame elements designated generally as A and A' including the spaced rails B held together by a plurality of special clamping devices designated generally as C and C'. Said clamping devices C—C' essentially include a top plate D and a bottom plate E respectively engaging the top and bottom portions of the rails B and secured together by a tension bolt F or its equivalent. The devices C are used anywhere along the frames but preferably at points where the machinery base is to be anchored, while the devices C' are used at the location of isolation units. When the frames A—A and A'—A' of Fig. 1 are assembled, they will support machinery bases indicated as M and M' in dotted lines.

The rails B which form the frames may be of right angular cross-section, as shown in Figures 1, 2, 3 and 7, or may be of other convenient cross-sectional shape. For example, the rails B' of Figure 4 may be of T-shaped cross-section; or the rails $B^2$ of Figure 5 may be of channel-shaped cross-section. Thus, it will be apparent that the particular shape of the rails constituting the frame may be varied within the scope of the invention to include available standard structural shapes.

Referring to the rails B, it will be seen that the clamping devices C are intended to hold the rails in rigid spaced parallel relation at selected locations throughout the length of the rails. In the preferred form of the invention, the top plate D of the clamping devices C is of substantially inverted channel-shaped formation in the sense that it includes a top web portion $d$ and the depending flanges $d'$. The bottom plate E is preferably flat, although it will, of course, be understood that this plate may likewise be varied in cross-sectional shape, if desired. The plates D and E are substantially as long as they are wide, but this proportion may vary if desired.

Referring more particularly to the clamping device C shown in Figure 7, it will be observed that the top plate D and bottom plate E are held together by the bolt F which passes through appropriate alined openings in the plates to receive a nut F' which, when rotated in the proper direction on the threaded shank of the bolt, will cause the plates to be clamped together and thus grip the rails, or, alternatively, the nut may be rotated in the opposite direction to relieve or release clamping pressure. When clamping pressure is relieved, it will be apparent that the clamping devices C may be slidably shifted longitudinally along the rails to any desired point by hand pressure or by the blow of a mallet or other appropriate tool. The bolt F of the clamping devices C shown in Figure 7 is also intended to engage the base of the machine to be supported on the frame A. That is to say, the clamping devices C are so positioned relative to the rails A that the bolts F will pass through an opening in the machinery base as well as the registering openings in the plates, thereby serving to anchor the machine properly to the frame while at the same time securing the clamping devices rigidly in position.

The frame elements A—A' are supported at proper intervals by suitable isolation units designated generally as G in Figures 2, 3, 8 and 9. In these latter figures the isolation units include cork or equivalent blocks, but it will of course be understood that other forms of vibration media may be employed. For example, Figures 10 and 11 show a modified form of isolation units G' wherein rubber is used as an isolation medium. Figure 12 shows a unit $G^2$ in which metallic springs may be used as the isolation medium. In all cases, however, the essential features of the clamping devices are preserved whether or not they serve to anchor the machinery base to the frame, as well as clamp the frame parts together, or whether they secure the isolation units at proper locations relative to the frame and its supported load.

In the above connection, reference will now be made to the form of clamping devices C', illustrated in Figures 8, 9, 10 and 11 for securing the isolation units to the frames. These clamping devices preferably include the identical parts previously described for the devices C except for the bolt and nut assembly F—F', the equivalents of which, in Figures 8 to 11 inclusive, are designated as $F^2$—$F^3$. In these figures the bolt $F^2$ is welded to the top plate D as shown at $w$ while the nut $F^3$ is elongated so as to receive the threaded end of another bolt $F^4$ which clamps the isolation unit in position relative to the frame. This arrangement also prevails in Figures 10 and 11.

Referring first, more in detail to Figures 8 and 9, it will be observed that the cork isolation block 1 is provided with a central opening while its base is formed by a metallic plate 2. This plate is provided with a countersunk portion 3 surrounding an aperture which receives a thimble or cup 4 whose bottom or transverse attaching wall 5 is provided with an opening for receiving the shank of bolt $F^4$. The head of this bolt, together with a washer bears against a rubber or other compressible disc 6 while the threaded shank thereof enters the elongated nut $F^3$ when the bolt is rotated. In this arrangement the clamping device C' is fitted to the desired position on the rails B—B by utilizing the elongated nut $F^3$ as a clamping nut in cooperation with the bolt $F^2$ which, as previously explained, is welded to the top plate C' of the clamp. The isolation unit G is then held to the bolt $F^2$ of the clamp by the bolt $F^4$ being manipulated as previously described.

The effect of the bolt $F^4$ entering the elongated nut $F^3$ is to draw the base plate 2 toward the frame through the medium of the cup 4. This arrangement also provides in effect a double-acting shock absorber, that is, one which assists in checking the tendency of upward movement of the frame A relative to the floor, as well as performing its normal function of damping vibrations transmitted from the machine to the floor or sub-base.

As will be seen from Figure 9, which is a sectional view taken at right angles to Figure 8, the isolation unit G is preferably provided with means for anchoring the same to the floor or sub-base. In the example shown, this means consists of an angle member 7 welded as at 8 to the base plate 2 and having its horizontal leg 9 provided with a fastening receiving opening 10 to admit a fastening for securing the frame to the floor.

As will be apparent from Figure 3, the frame A has isolation units G at each end, the same having the angles 7 as above described attached thereto for the purpose of providing an anchor between the frame and the sub-base. However, it will be noted that a unit of the type of the isolation unit G may be placed at other locations, medially of the ends of the frame if desired.

The type of isolation unit G', shown in Figures 10 and 11, and connected to the frame A or A' by the clamping device C', includes a substantially arched isolation bracket designated generally as 11 and including a transverse attaching wall 12 provided with an opening while the downwardly extending legs thereof include the rubber isolation elements 13 vulcanized to the parts forming the legs. Each of the legs including vibration isolation elements 13 are provided with outwardly extending feet 14 which engage in the grooves provided by the inturned flanges 15 of the base plate 16. The isolation unit G' is attached to the clamping device C' in the same manner as the isolation unit G is attached to its related clamping device C'. In that connection it will of course be understood that the clamping devices C' are essentially the same as each other, and, in turn, each of these clamping devices includes the same elements as the clamping devices C.

Referring specifically to Figures 10 and 11, the elongated nut $F^3$ is intended to receive the threaded shank of a bolt 17 whose head engages beneath the transverse attaching web 12 of the unit G' so that when the bolt 17 is screwed into the elongated nut $F^3$, the isolation unit G' is secured to the clamping device. The arrangement shown in Figures 10 and 11 has the advantage that since the elongated nut $F^3$ is more or less exposed for tool engagement at all times, the elements of the clamping device may be left somewhat loose after the bolt 17 of the isolation unit has been partially screwed into position so that the entire unit and clamping device may be shifted along the frame even after it has been installed and before final adjustments have been made. In that connection it will also be observed that the head of the bolt 17 is accessible for tool engagement.

In Figures 10 and 11 the base plate 16 may be provided at one end with an opening 18 to receive a fastening for anchoring the unit G' to the floor or sub-base.

Figure 12 of the drawings illustrating the coil spring type of isolator $G^2$ includes clamping device $C^2$ heretofore described as comprising the parts D and E and the bolt and nut combination $F^2$—$F^3$ for clamping the rails B in position. The isolator spring S has its upper end seated in a cup 19 which may bear against a washer or shim, if desired, while its lower end is seated in the spring cup 20 which rests on the countersunk portion 21 of the metallic plate 22 whose outer edges are interlocked with the flanges 23 of the base plate 24. The opening in the plate 22 bounded by the countersunk portion 21 receives the flanged cup element 25 whose perforated transverse wall receives the bolt $F^4$. As shown, the head of the bolt $F^4$ clamps an isolation medium 26 between the underside of its head washer and the transverse wall of the cup. Hence, when the bolt $F^4$ is screwed into the coupling nut $F^3$ the entire structure will be held assembled and the isolator $G^2$ will function in the intended way.

Figure 13 illustrates another form of isolation unit, designated generally as $G^3$, wherein the clamping device $C^3$ is different from the clamping devices C, C' and $C^2$ previously described. In this arrangement the block of cork or other isolation medium 27 is provided with a central opening and its bottom face rests on the metallic plate 28 having the countersunk portion 29 which receives the cup 30. The perforated transverse wall of the cup 30 is intended to receive a bolt $F^5$ whose head portion, with the aid of a washer, compresses isolation material 31 against the perforated transverse wall of the cup. The threaded end of the bolt $F^5$ screws into the nut $F^6$ welded to the underside or web of the top plate $D^2$. This plate has the marginal edges thereof turned inwardly to form the flanges 32 which receive the related flange of a rail member $B^3$, which, as will be observed from the drawing, is in the form of an angle iron whose vertical flange portion engages the side of the block of isolation material 27. It will thus be seen that the top plate $D^2$ may be utilized as the means for clamping the rails $B^3$ together against the sides of the isolation material shown and that the top plate $D^2$ is anchored to the metallic bottom plate 28 through the medium of the bolt $F^5$ and nut $F^6$. It will of course be understood that in assembling the arrangement just described the rails $B^3$ may be slidably interlocked with the top plate $D^2$ and then the isolation unit 27 put in place and secured by the bolt $F^5$ as just described. It will also be understood that the rails $B^3$ may be held in proper position by the flanged top plate $D^2$ at points intermediate isolation units including the blocks of isolation material 27. Also, if desired the plate $D^2$ may be provided with an upstanding bolt on the order of the bolt F in Fig. 7 to anchor a machinery base to the isolation unit.

Figure 6 of the drawings illustrates a modified form of clamping device $C^2$ wherein the body $d^2$ of the top plate D does not have depending side flanges, that is, the top and bottom plates D and E are of substantially the same configuration but both are initially bowed in reverse directions so that when they are clamped together the ends bite into the rails.

From the foregoing, it will be apparent that the individual frames A—A' may be readily assembled by bringing the rails B into parallel relation and fitting the clamping device C thereto. Likewise, the isolation units G or G' may be initially assembled to their approximate positions. After the frames are set up and the isolation units are adjusted and set in the desired locations, the clamping devices C may be positioned so as to permit the openings therein to register with the openings in the machine base whereupon the bolt and nut assembly F—$F^1$ may be put in place to thereby secure the machine to the frame which rests on the isolation elements in spaced relation to the floor or sub-base.

In connection with the isolation units G and G', it will be seen that their relative adjustability along the rails has the advantage of permitting said units to be shifted to compensate for any inaccuracies in the level of the floor or sub-base prior to mounting the machine on the frame, as well as to properly support the load.

In connection with the lateral frames A' it may be pointed out that they may be built up in the manner described for the frames A. However, it is only necessary to weld the ends of the rails B of the lateral frames A' to one of the rails B of the main frame, at the points x, during initial assembly at the shop. Thus, the total weight of welded parts is reduced to a minimum and relatively small cargo space is required for shipment.

From the foregoing, it is believed that the features and advantages of the invention will be readily apparent to those skilled in the art and it will of course be understood that changes can be resorted to within the scope of the appended claims.

I claim:

1. A vibration isolation support for machinery, comprising in combination, rail members, means for holding said rail members together to provide an elongated frame, said means consisting of a plurality of devices arranged at selected intervals throughout the length of the rail members for holding the same in rigid spaced parallel relation, said devices including upper and lower clamping plates held in gripping relation to the rails by bolt and nut tension and vibration absorbing means associated with certain of said devices.

2. A vibration isolation support for machinery, comprising in combination, rail members forming an elongated frame, clamping devices including upper and lower plate elements for engaging related parts of said rails at spaced intervals to hold said rail members in rigid spaced parallel relation, bolt and nut means for compressing and releasing said plates relative to the rails, and vibration absorbing means associated with certain of said clamping devices.

3. A vibration isolation support for machinery, comprising in combination, rail members forming an elongated frame, clamping devices including upper and lower plate elements for engaging related parts of said rails at spaced intervals to hold said rail members in rigid spaced parallel relation, bolts and nut means for compressing and releasing said plates relative to the rails, certain of said bolt and nut means including an elongated nut, and vibration absorbing units positioned beneath the frame, said units each including an attaching member having an opening, a bolt having a head and a threaded shank, the latter passing through said opening to engage said elongated nut, whereby, when the bolt is rotated, the head will draw the said attaching member of the vibration absorbing unit upwardly as the threaded shank proceeds into the elongated nut.

4. A vibration isolation support for machinery, comprising in combination, a frame including rail members, a plurality of two part clamping devices adjustable longitudinally along the frame to maintain the rails in spaced parallel alinement, certain of said clamping devices having means for causing the clamping devices to grip the rails and anchor a machine base to the rails, and other two part clamping devices having means for causing the devices to grip the rails and also anchor vibration dampers beneath the rails to support the same and above a floor or the like.

5. A vibration isolation support for machinery, comprising in combination, spaced parallel angle members forming an elongated frame, said angle members having their included angles facing inwardly, a series of clamping devices spaced at intervals and adjustable longitudinally along said angle members and having means for gripping holding the angles in rigid parallel alinement, and isolation units for supporting the frame on a floor or the like at the location of selected clamping devices.

6. A vibration isolation support for machinery, comprising in combination, parallel angle members constituting the rails of an elongated frame, said members having their included angles facing inwardly, and a series of rail clamping devices spaced at intervals along said angle members having means for holding the angles in rigid parallel alinement, said rail clamping devices each comprising a transversely disposed upper inverted channel plate and a transversely disposed bottom plate respectively engaging top and bottom portions of the rails, a clamping bolt and nut medially engaging said plates; and isolation units associated with certain of said clamping devices.

7. A vibration isolation support for machinery according to claim 6, wherein, the nut of a clamping device associated with an isolation unit is elongated, and the isolation units include, a vibration absorbing body having a central opening, a perforated base plate, a flanged cup positioned in the opening and having its flange engaging the base plate, and a bolt whose head engages the horizontal wall of the cup while its shank engages the elongated nut to secure the unit to the clamping device and in turn to the frame.

8. A vibration isolation support for machinery, according to claim 6, wherein the nut of a clamping device associated with an isolation unit is elongated, and the isolation unit includes, a frame having a transverse attaching portion provided with an opening, downwardly extending legs having vibration absorbing means interposed therein, said legs terminating in outwardly extending feet, and a base plate having inturned flanges to receive said feet, and a bolt passing through the opening of said transverse attaching portion and entering said elongated nut.

9. A vibration absorbing support for machinery, bases, comprising in combination, elongated frames including, rails held in spaced relation by clamping devices adjustable longitudinally along the rails, vibration absorbing units at an end of each frame and secured thereto by one of said clamping devices, said units each including a base plate, and an angle member secured to said base plate and having its horizontal leg perforated to receive a fastening for anchoring the unit and frame to a floor or sub-base.

10. In a vibration isolation support for machinery, comprising in combination, frame elements including spaced rails disposed in parallel relation, and clamping devices including a web portion having down-turned side flanges for engaging outer portions of the rails to hold said rails against spreading, and means for engaging the inner portions of the rails against lateral movement toward each other.

11. A vibration isolation support for machinery, comprising, frame elements including spaced rails disposed in parallel relation, and clamping devices including a web portion having downwardly and inwardly turned flange portions for engaging the outer portions of the rails to hold said rails against spreading, and means cooperating with the web of said clamping device and the inner portions of the rails to prevent said rails from moving laterally inward toward each other.

12. In a vibration isolation support for machinery, frame elements, comprising, in combination, spaced rails, and a plurality of readily attachable and detachable clamping devices slidably adjustable along the rails to selected set positions and including upper and lower plate elements held in clamping relation to the rails by bolt tension to secure said rails in spaced parallel relation.

13. In a vibration isolation support for machinery, frame elements, comprising, in combination, spaced rails, clamping devices selectively positioned at spaced intervals along said rails and having means for holding said rails in spaced parallel relation, and means serving to cause the clamping devices to releasably grip the rails and also anchor a vibration damper to the frame.

14. In a vibration isolation support for machinery, frame elements, comprising, in combination, spaced rails, clamping devices selectively positioned at spaced intervals along said rails and having means for holding said rails in spaced parallel relation, certain of said clamping devices having means for anchoring a machinery base to the frame, and other clamping devices having means for anchoring a vibration damper to the frame.

SIEGFRIED ROSENZWEIG.

REFERENCES CITED

The following references are of record in the file of this patent:

UNITED STATES PATENTS

| Number | Name | Date |
| --- | --- | --- |
| 1,278,846 | Budd | Sept. 17, 1918 |
| 1,389,424 | Brun | Aug. 30, 1921 |
| 1,974,158 | Okenfuss | Sept. 18, 1934 |
| 2,001,111 | Rhodes et al. | May 14, 1935 |
| 2,210,051 | Woodbury | Aug. 6, 1940 |
| 2,230,511 | Luttrup | Feb. 4, 1941 |